Jan. 7, 1958     S. S. KUBIK ET AL     2,819,004
OUTSIDE SPARE TIRE MOUNTING FOR STATION WAGONS AND TRUCKS
Filed June 13, 1955
2 Sheets-Sheet 1
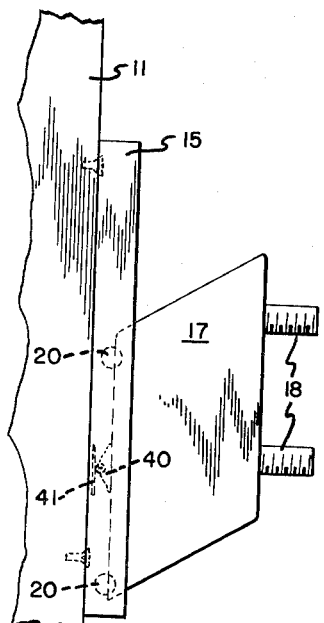
FIG.-1-
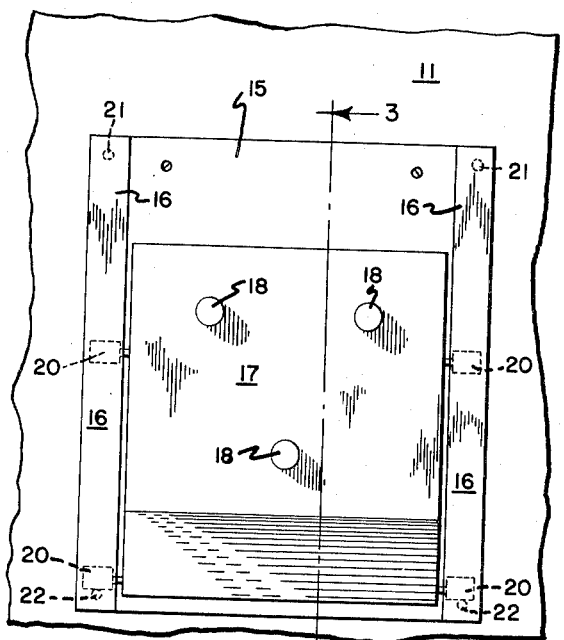
FIG.-2-
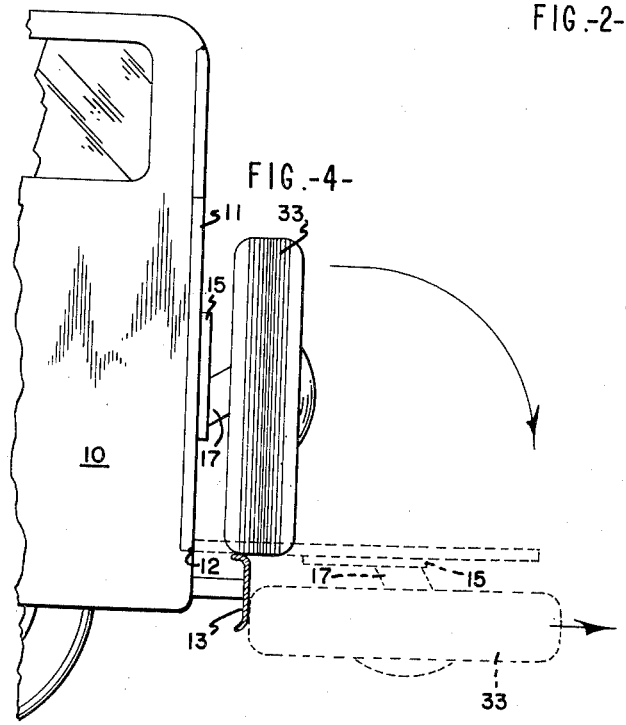
FIG.-4-
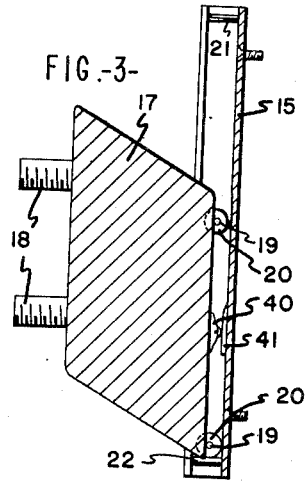
FIG.-3-
STANLEY S. KUBIK
JOHN KUBIK
INVENTORS
BY Robert C. Comstock
THEIR ATTORNEY Jan. 7, 1958  S. S. KUBIK ET AL  2,819,004
OUTSIDE SPARE TIRE MOUNTING FOR STATION WAGONS AND TRUCKS
Filed June 13, 1955
2 Sheets-Sheet 2
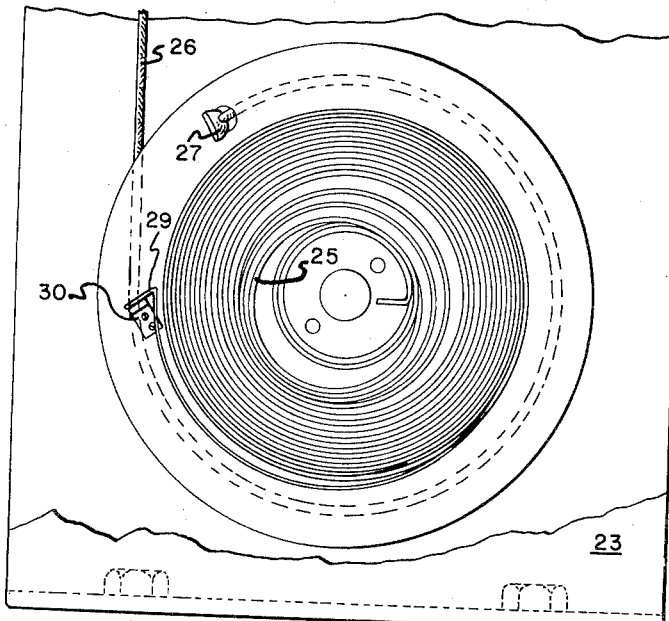
FIG.-5-
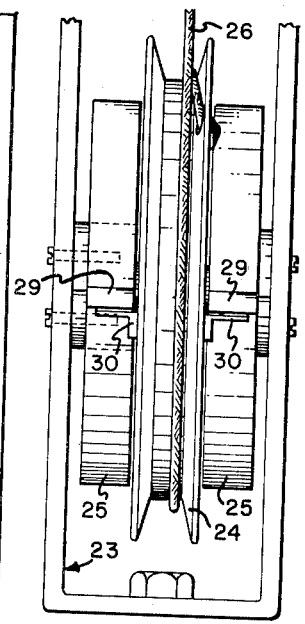
FIG.-6-
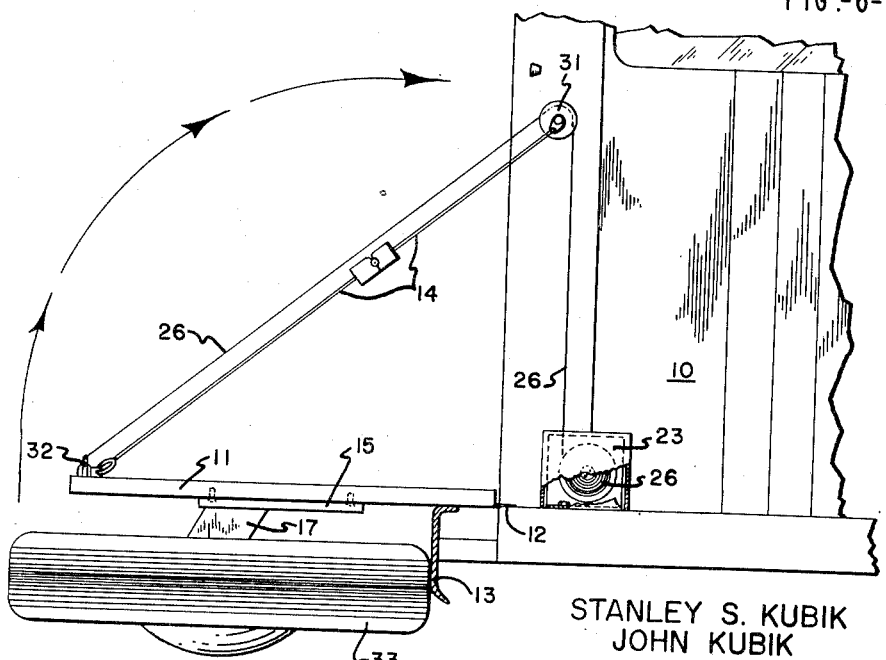
FIG.-7-
STANLEY S. KUBIK
JOHN KUBIK
*INVENTOR.*
BY Robert C. Comstock
THEIR ATTORNEY

United States Patent Office 2,819,004
Patented Jan. 7, 1958

2,819,004

OUTSIDE SPARE TIRE MOUNTING FOR STATION WAGONS AND TRUCKS

Stanley S. Kubik and John Kubik, Los Angeles, Calif.

Application June 13, 1955, Serial No. 515,094

5 Claims. (Cl. 224—42.21)

This invention relates to an outside mounting for the spare tire of a station wagon, truck, or other vehicle of the type having a hinged tailgate.

At the present time it is customary to mount the spare tire of such a vehicle within the body compartment. This results in a great deal of waste space in the area occupied by the tire and mounting means and the area therearound. In the case of passenger vehicles or those carrying dry cleaning or similar articles, care must be taken to avoid the area around the spare tire to avoid soiling the person or clothing.

It is an object of our invention to overcome these and other disadvantages of the present construction by providing the means for mounting the spare tire on the outside of the vehicle.

It is a further object of our invention to provide such a device which overcomes the difficulties which have previously prevented such a mounting of the spare tire. One of these difficulties is interference between the spare tire and the normal space and positioning of the bumper, tailgate, and other components adjacent the rear of the automobile. Another difficulty is the problem of lifting the weight of the spare tire in raising the tailgate of the vehicle.

It is a further object of our invention to provide such a device which is adapted to be installed in substantially any existing vehicle and which is also adaptable for use in the original manufacture and construction of vehicles.

It is a further object of our invention to provide a device of the class described which is simple and economical to construct and install and which is simple and effective to use.

Our invention also comprises such other objects, advantages and capabilities as will later more fully appear and which are inherently possessed by our invention.

While we have shown in the accompanying drawings a preferred embodiment of our invention, it should be understood that the same is susceptible of modification and change without departing from the spirit of our invention.

Referring to the drawings, Fig. 1 is a side elevational view of our mounting bracket without a tire;

Fig. 2 is a front elevational view of the same;

Fig. 3 is a sectional view of the same, taken on line 3—3 of Fig. 2;

Fig. 4 is a side elevational view of our mounting bracket in use, with the movement thereof indicated in dotted lines;

Fig. 5 is a sectional view of the coil spring which is mounted in the cable drum;

Fig. 6 is an end view of the cable reel and drum;

Fig. 7 is a side elevational view of our device in use with the tailgate shown in lowered position and the cable reel box shown partly in section.

A preferred embodiment which has been selected to illustrate our invention is designed for use with a station wagon, truck, or other vehicle having a hinged tailgate. The conventional structure of such a vehicle is best shown in Fig. 7 of the drawings. The vehicle 10 has at the rear end thereof a tailgate 11, which is pivotally attached by a hinge 12. A rear bumper 13 extends across the rear of the vehicle. Suitable control means are provided for normally maintaining the tailgate 11 in vertical or raised position. A pair of hinged arms 14 permit movement of the tailgate 11 to horizontal or lowered position and prevent its movement therebeyond. The tailgate 11 may also contact the bumper 13 when in lowered position.

The mounting means of our invention comprises a stationary plate 15, which is attached to the back of the tailgate 11, preferably adjacent the center thereof, by bolts or other suitable attaching means. The plate 15 is provided adjacent its opposite edges with a pair of substantially parallel vertically extending tracks 16. The tracks 16 are substantially U-shaped, with their interfacing edges being open.

A movable bracket 17 is slightly narrower in width than the distance between the inner edges of tracks 16 and is shorter in height than plate 15. The bracket 17 is provided with three screw threaded members 18, which project outwardly therefrom and are adapted to receive and hold a spare tire which may be mounted thereon in a conventional manner.

Extending outwardly from each of the side edges of bracket 17 is a pair of pins 19, on each of which is mounted an elongated roller 20. The rollers 20 are rotatably mounted in the tracks 16. Bracket 17 is adapted to be moved vertically with respect to plate 15, with rollers 20 moving within tracks 16. Upper stop members 21 extend transversely across the upper ends of tracks 16 to limit the upward movement of bracket 17 while lower stop members 22 extend transversely across the lower ends of tracks 16 to limit the downward movement of bracket 17.

A cable box 23 is attached to the floor of the vehicle 10, preferably in one corner thereof adjacent the tailgate 11. Rotatably mounted within cable box 23 is a circular reel cable 24 and a pair of springs 25. A cable 26 is wound around the reel 24 with the end of cable 26 extending through an opening in the side of reel 24. An enlarged end member 27 is attached to the end of cable 26 to prevent the end of the cable from slipping through the opening.

The springs 25 are concentrically wound, with one end being attached to the central shaft on which the reel 24 is rotatably mounted. The opposite ends of springs 25 are provided with right angled end portions 29. Reel 24 has a pair of brackets 30 extending outwardly from its opposite sides. The end portions 29 of spring 25 are attached to brackets 30 so that as cable 26 is unwound from reel 24, the latter is rotated, causing the end portions 29 to move in such direction as to tighten springs 25 and increase their tension. Springs 25 thus tend to oppose the unwinding of cable 26 and to aid its winding around reel 24.

The cable 26 extends from reel 24 around a pulley 31, which is rotatably mounted on the inside of the vehicle frame adjacent the top of tailgate 11 when the same is in raised position. The pulley 31 may be mounted on the same mounting means which normally holds the upper end of hinged arms 14 or may be otherwise suitably attached to the inside of the vehicle in a position which is upwardly directed from the cable box 23.

The opposite end of the cable 26 is attached to a holding member 32 which is mounted in the upper corner of the tailgate 11 adjacent the connection thereof of the opposite end of the hinged arms 14. While the cable assembly may function equally well in other positions, it is considered preferable to place the cable box 23 in the corner of the vehicle so that the cable 26 and pulley 31 are disposed adjacent the hinged arms 14. In this way, they are not noticeable and do not interfere in any way with the use of the vehicle and tailgate.

In use, the plate 15 and bracket 17 are attached to the back of the tailgate 11 in such position that a spare tire 33 when mounted thereon will have its top adjacent but not higher than the top of the tailgate. This places the bottom of the spare tire 33 in contact with or adjacent to the top of the rear bumper 13 when the tailgate 11 is in raised position.

When the tailgate 11 is lowered in the conventional manner, the spare tire 33 pivots on the rear bumper 13, moving upwardly toward the top of the tailgate 11. This movement is permitted by movement of the bracket 17 with respect to the plate 15 and is limited by the arms 14, which prevent movement of tailgate 11 beyond a horizontal position.

While the tailgate 11 is thus being lowered, the cable 26 is unwound from reel 24. As this occurs, the cable 24 is rotated, winding coil springs 25 more tightly to increase the tension therein. The tension thus created in springs 25 tends but is not sufficient by itself to move tailgate 11 back to vertical or raised position.

When the tailgate 11 is moved from lowered to raised position, this tension in springs 25 assists such movement and carries some of the weight of the tailgate 11 and the heavy spare tire 33. Without such assistance, the weight of the tire might be too much for some persons to lift in closing tailgate 11. The springs 25 also assist in lifting the weight of the tailgate 11 alone. As the tailgate 11 is raised, spare tire 33 pivots on rear bumper 13 and moves back to its former position, with bracket 17 sliding downwardly with respect to plate 15 as rollers 20 move in track 16.

In order to prevent rattling of the bracket 17, a small ball bearing member 40 is mounted on the back of bracket 17 extending toward the inside of plate 15. A wedge 41 is mounted on the inside of plate 15 in such position that it is aligned with ball bearing member 40 when the tailgate 11 is in raised position. As the bracket 17 moves toward its normal position, ball bearing member 40 engages the inner top edge of wedge 41 and travels along wedge 41, urging bracket 17 away from blade 15 to take up any looseness which may exist between them.

Our device can, of course, also be adapted for use without the rear bumper, using other suitable pivot means or depending upon gravity for movement of the spare tire. It may also be noted that our spare tire mounting does not interfere with the visibility of the driver as does the conventional inside mounting.

With regard to the action of springs 25, it is contemplated that instead of both end portions 29 being attached to brackets 30, one might be attached and the other left free. One of the springs 25 will then unwind approximately one revolution to place the free end portion 29 substantially a full revolution away from its bracket 30. After cable 24 turns a full rotation, bracket 30 would catch end portion 29 and carry it around from that point on. The tightening action of one spring 25 would thus start one revolution later than that of the other spring. This would reduce the spring tension when it is not particularly needed, while providing ample spring tension when the load is heaviest.

It will be noted that our device is essentially simple and fool-proof in its construction and operation and is yet effective to solve in a satisfactory manner all of the problems involved in providing an outside mounting for the spare tire on the tailgate of a vehicle.

We claim:

1. An outside spare tire mounting for vehicles of the type having a hinged tailgate and a rear bumper extending along the rear of the vehicle beneath the tailgate, said mounting comprising a substantially rectangular stationary plate attached to the outside of the tailgate, said plate having a pair of oppositely disposed parallel vertical tracks at the side edges thereof, a substantially rectangular bracket having three screwthreaded members projecting outwardly therefrom, said members being adapted to removably hold a spare tire, said bracket having a roller disposed adjacent each of the four corners thereof, said rollers being movably mounted in said track to permit movement of said bracket with respect to said plate, stop means disposed adjacent the top and bottom of at least one of said tracks to limit the movement of said bracket with respect to said plate, said bracket being so disposed that the spare tire held thereon has its top edge beneath the top edge of the tailgate and its bottom edge adjacent the top of the rear bumper, said spare tire adapted upon the lowering of the tailgate to pivot upon the rear bumper, moving said bracket toward the top of the tailgate to permit movement of the tailgate to horizontal position.

2. An outside spare tire mounting for vehicles having a hinged tailgate and a rear bumper disposed therebeneath, said mounting comprising a stationary plate attached to the outside of the tailgate, said plate having a pair of oppositely disposed parallel vertical tracks at the side edges thereof, a bracket having means for removably receiving and holding a spare tire, said bracket having roller means disposed at each side thereof, said roller means being movably mounted in said tracks, said plate and bracket being mounted so that the top of the spare tire held thereon is disposed adjacent the top of the tailgate and the bottom of the spare tire is disposed adjacent the rear bumper when the tailgate is in raised position, the bottom of the spare tire being adapted to pivot on the rear bumper when the tailgate is lowered, moving said bracket toward the top of said tailgate to permit lowering of the tailgate to horizontal position, said bracket moving in the opposite direction upon raising of the tailgate.

3. An outside spare tire mounting for vehicles having a hinged tailgate and a rear bumper disposed therebeneath, said mounting comprising a stationary plate attached to the outside of the tailgate, said plate having a pair of oppositely disposed vertical tracks at the side edges thereof, a bracket having means for removably receiving and holding a spare tire, said bracket having means at each side thereof movably mounted in said tracks, said plate and bracket being mounted so that the top of the spare tire held thereon is disposed adjacent the top of the tailgate and the bottom of the spare tire is disposed adjacent the rear bumper when the tailgate is in raised position, the bottom of the spare tire being adapted to pivot on the rear bumper when the tailgate is lowered, moving said bracket toward the top of said tailgate to permit lowering of the tailgate to horizontal position, said bracket moving in the opposite direction upon raising of the tailgate.

4. In a spare wheel mounting for vehicles having a hinged tailgate and a rear bumper disposed beneath said tailgate, guide means attached to the outer side of said tailgate, a bracket having means for removably receiving and holding a spare wheel, means attached to said bracket and engaging said guide means for movement of the bracket parallel to the tailgate toward and away from the outer free end thereof, a spare wheel attached to said bracket, said wheel being disposed in cooperative relation with said bumper so that when the tailgate is swung from its upright closed position to its outward open position the wheel pivots about the bumper and moves toward the outer end of the tailgate.

5. The construction as set forth in claim 4 wherein said guide means comprises opposed tracks and said means attached to the bracket comprises projections having rolling contact with said tracks.

References Cited in the file of this patent

UNITED STATES PATENTS

| | | |
|---|---|---|
| 2,117,049 | Widman et al. | May 10, 1938 |
| 2,242,650 | Mantz | May 20, 1941 |
| 2,354,943 | Clark | Aug. 1, 1944 |
| 2,433,169 | Stephenson et al. | Dec. 23, 1947 |

FOREIGN PATENTS

| | | |
|---|---|---|
| 412,315 | Great Britain | June 28, 1934 |